No. 775,037. PATENTED NOV. 15, 1904.
M. HAVENS, Jr.
BRANCH BOX FOR INSULATED ELECTRIC WIRES.
APPLICATION FILED NOV. 3, 1903.
NO MODEL. 3 SHEETS—SHEET 1.
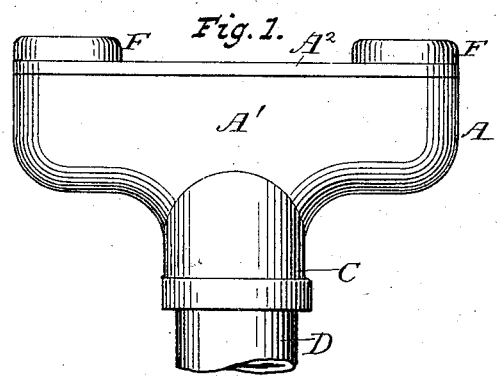
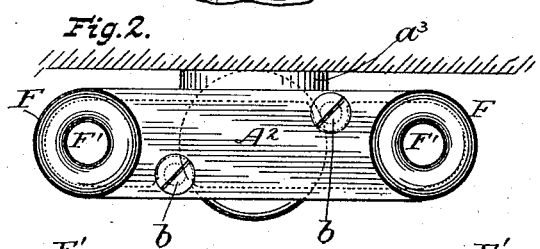
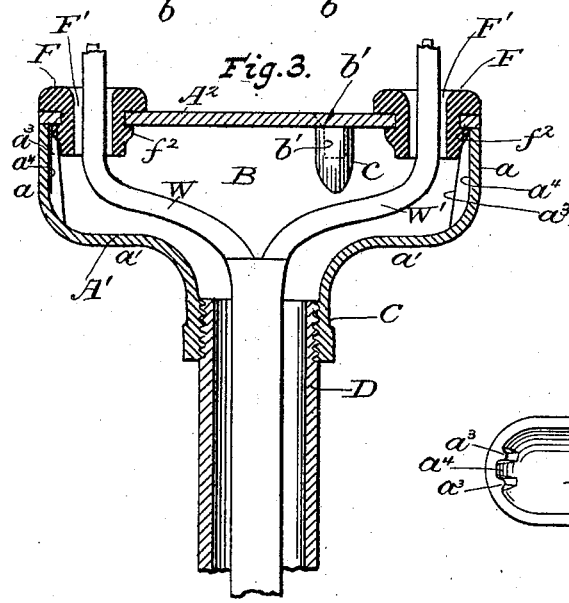
Witnesses.
Morton Havens, jr
Inventor.
by Alex. Selkirk
Attorney.

No. 775,037. PATENTED NOV. 15, 1904.
M. HAVENS, Jr.
BRANCH BOX FOR INSULATED ELECTRIC WIRES.
APPLICATION FILED NOV. 3, 1903.
NO MODEL. 3 SHEETS—SHEET 2.
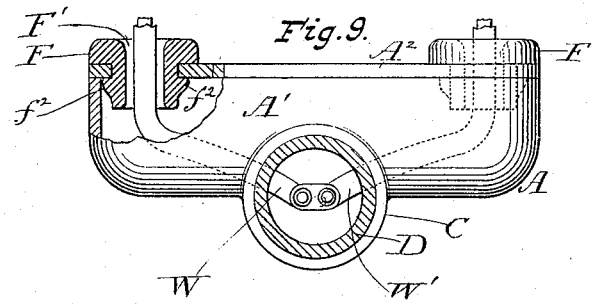
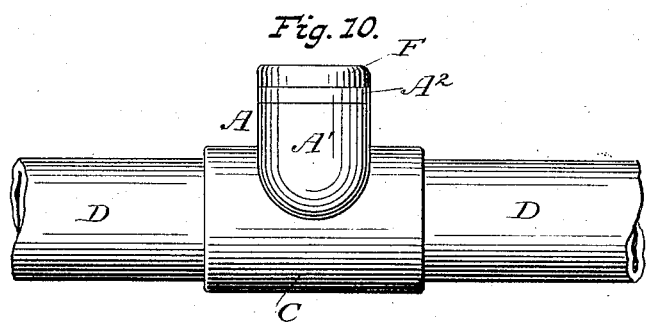
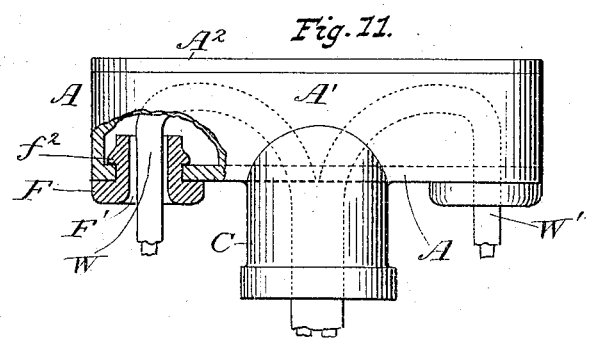
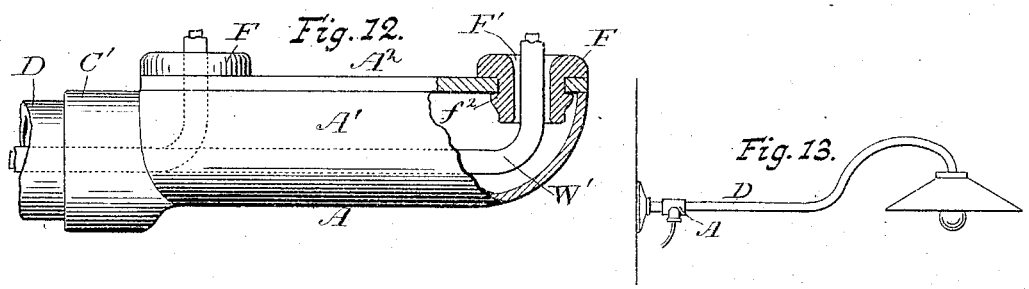
Witnesses.
Charles Selkirk
H. Selkirk
Morton Havens, jr
Inventor.
by Alex. Selkirk
attorney

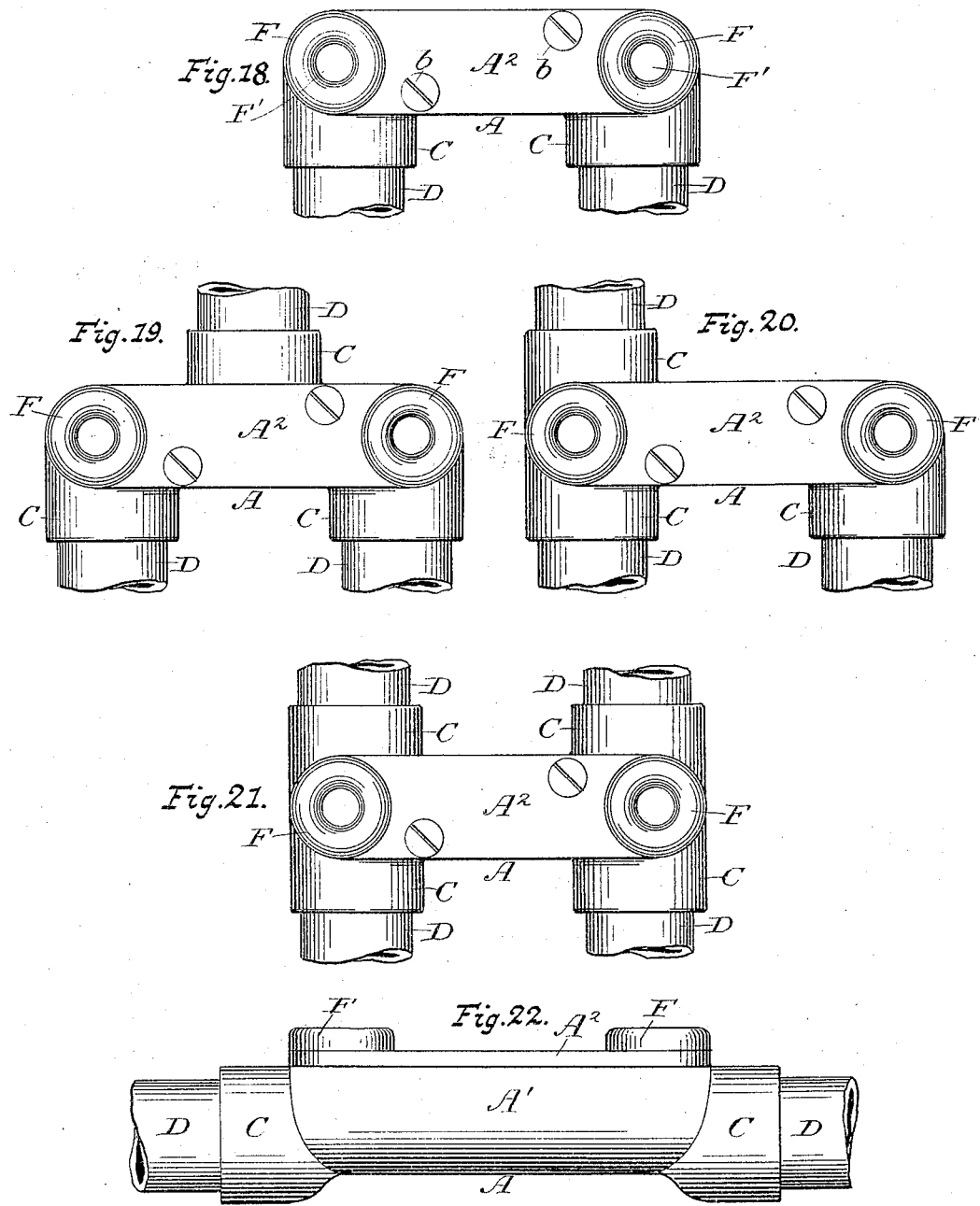

No. 775,037. Patented November 15, 1904.

UNITED STATES PATENT OFFICE.

MORTON HAVENS, JR., OF ALBANY, NEW YORK.

BRANCH BOX FOR INSULATED ELECTRIC WIRES.

SPECIFICATION forming part of Letters Patent No. 775,037, dated November 15, 1904.

Application filed November 3, 1903. Serial No. 179,734. (No model.)

REISSUED

*To all whom it may concern:*

Be it known that I, MORTON HAVENS, Jr., a citizen of the United States, residing at Albany, in the county of Albany and State of New York, have invented new and useful Improvements in Branch Boxes for Insulated Electric Wires, of which the following is a specification.

This invention relates to boxes for branching insulated electric wires; and it consists in the novel construction of parts and the novel arrangements and combinations of parts and elements hereinafter described, and set forth in the claims.

The object of this invention is to provide, with a metallic tubular conduit, a box having in it an oblong branch chamber of narrow width, which communicates with said conduit for passage of two insulated electric wires in either direction to or from the same, with the wires separated and branched and having passage through individual insulators suitably fixed in a box-closing piece, which is removably secured to the body of the box, and are adapted to hold the branching wires at suitable distances apart.

Other objects and advantages will be clearly understood from the following description when taken in connection with the drawings, in two sheets, forming a part of this specification, in which—

Figure 1 is a side elevation of the branch box embodying the improvements and tubular conduit coupled together. Fig. 2 is a plan of the same. Fig. 3 is a vertical section. Fig. 4 is a view of the box from its lower side. Fig. 5 is a plan of the box-closing piece. Fig. 6 is a section of the same. Fig. 7 is a view of an insulator employed in the box-closing piece shown in section. Fig. 8 is a view of the same from its stem end. Fig. 9 is a side elevation of a box with a modified form of construction with parts shown in section. Fig. 10 is a view of the same from an end of the box. Fig. 11 is a side elevation showing another modification of form with part in section. Fig. 12 is a modification showing a conduit applied to one end of a box. Fig. 13 is a view showing an application of this invention to a conduit for a street-lamp. Fig. 14 is a plan of one end of the branch box with the closing-piece removed and showing a device for holding a seated insulator from turning. Fig. 15 is an inside elevation of the same device. Fig. 16 is a plan showing a modification of the device shown in Fig. 14. Fig. 17 is an inside elevation of the same. Fig. 18 is a plan of a modification of the branch box for coupling on two conduits. Fig. 19 is a modification for coupling on three conduits. Fig. 20 is a plan of another modification for coupling on three conduits. Fig. 21 is a plan of a modification for coupling on four conduits, and Fig. 22 is a plan of a modification for coupling on the box two conduits in alinement with the length of the body of the same.

Similar letters of reference refer to several parts throughout the several views.

In this invention the drawings show branch boxes for coupling on them, respectively, one or more conduits up to four in number. These several modifications shown do not relate to the branch box itself, but to the situation and position of the projection provided with screw-threads for coupling the box on the respective conduits which may be employed with it. I will therefore give a particular description of the novel elements embodied in the branch box itself.

In the drawings, A is a branch box embodying the novel parts and elements in this invention and comprises the body $A'$ and closing-piece $A^2$. The body $A'$ may be made of cast-iron, malleable iron, brass, or any other suitable alloy and has in it the oblong chamber B, which is closed on three sides by walls $a\ a\ a'$, and closing-piece $A^2$, which is removably secured to the said body $A'$, preferably by screws $b$ passing through suitable perforations $b'$ and screwing into screw-threaded perforations made in the internal projections $c\ c$, which project inward from side walls $a\ a$ and are integral with the same. This chamber B is of length preferably between three and one-half inches and four inches in the clear between side walls $a\ a$, preferably about three-quarters of an inch, yet it may be of greater or less width, according as may be found to be advantageous for readily receiving two or more insulated wires W W'.

In body A', at a suitable point therein, is provided a screw-threaded perforation C for coupling said body with the tubular electric conduit D, preferably iron, which incloses a negative and a positive wire, which after passage out from said conduit enters into the chamber B and separate and are spread apart within said chamber and pass out therefrom through the closing-piece A² at points about two and one-half inches apart or at such other distance apart as boards of underwriters or municipal or other laws may specify said two wires W W' are to be apart for insuring safety of wires for preventing accidental burning of combustible substances in near proximity to the same. Provided on an outside portion of this body A' is a guard $a^3$, which prevents said body from having close contact with a partition, wall, or ceiling or other part of a building.

In Figs. 14 and 15 are shown two vertical projections $a^3$ $a^3$, which are projected inward from the ends of the body of the box, between which projections is vertical groove $a^4$, and in Figs. 16 and 17 is shown instead of said projection $a^3$ $a^3$ and groove $a^4$ the cavity $a^5$, the purposes of which elements will be hereinafter described.

The closing-piece A² consists of an oblong piece of metal of length, width, and form in correspondence with the outline of the outer walls of said body A, surrounding the opening of chamber B. This closing-piece is provided with two circular perforations E E, having their centers about two and one-half inches apart for reception-insulators F. In this closing-piece are provided suitable notches $e$ $e$, made in the circumferential wall of said perforations E, which notches extend radially from the respective perforations to a short distance.

The insulators F are preferably made of porcelain or glass or other substance which is a good non-conductor and not inflammable.
These insulators are duplicates of each other and comprise a ring-form outer portion $f$, circular stem $f'$ of diameter corresponding with the diameter of perforations E E in the closing-piece A², into which said stem $f$ enters, and projections $f^2$ $f^2$ from the outside of said stem to a distance corresponding with the notches $e$ $e$ made in the closing-piece A' and extending out from the respective perforations E, so that said projections $f^2$ may pass through said notches $e$ $e$ when stems $f'$ are entered into the respective perforations and interlock with the portion of the material in which said notches are made. These insulators F are provided with central perforations F', which communicate, respectively, with chamber B and receive each one of the two insulated wires W W', which are in the chamber of this box and are branched in direction from each other as they enter said chamber from the conduit D, inclosing both said wires.

The closing-piece A² will have its insulators F inserted in place in it and be turned a quarter-turn, so that the projections $f^2$ $f^2$ from stems $f'$ may be in situation for register with groove $a^4$, Figs. 14 and 15, or cavity $a^5$ in Figs. 16 and 17 when said closing-piece is applied in place to the open side of the body A' of the box. The branches of wires W W' will be passed from the chamber of the box and through the central openings in the insulators F F before the closing-piece A² is applied to the box. The said closing-piece will now be applied to the box, with one of the projections $f^2$ of the stems of the insulators entered into groove $a^4$ or notch $a^5$, when the closing-piece A² will be secured in place on body A' by screws $b$ $b$. When secured in place, the insulators will be securely held from turning in either direction. In Fig. 3 the two insulated wires in said conduit are shown to be held adjoining each other by an outer insulating-covering, which outer covering is cut away or removed from the two separate insulated wires lodged in the chamber B and projecting out through the insulators F F; yet these insulated wires W W' may be contained in the tubular conduit D without being bound together by a common outer insulating-covering.

In Figs. 1 and 3 this branch box A is shown to be coupled on the upper end of a vertical conduit D by its screw-thread perforation C being screwed on the screw-threaded upper end of said conduit, and the two wires passing from said conduit into the chamber B are made to branch out from each other and respectively have passage out from said chamber through the central openings of insulators F F at suitable distance apart to be continued in direction and to a distance preferred.

In Figs. 9 and 10 this branch box is shown to be coupled to two horizontal conduits D' D² and in its chamber receives the wires W W' from the said conduits when they pass out separately through the respective insulators F F.

In Fig. 11 this branch box is shown to be provided with a screw-threaded projection for coupling with a vertical conduit D and the box-closing piece A², which is removably secured to the upper open side of the body A' of the box A.

In Fig. 12 the box shows a horizontal tubular conduit coupled with it by one of its ends being provided with a screw-threaded perforation C', (which screw-thread is not shown,) into which the screw-threaded end of the conduit may be screwed while the closing-piece A' is applied to the upper side of the body of the box.

In Fig. 18 this branch box is shown to be provided with means for coupling it with two conduits D.

In Fig. 19 the box is shown to be provided with means for coupling it with two conduits D, one at each end of the box and the other at opposite side and at the middle of length of the same.

In Fig. 20 the box is shown to be coupled with two conduits D from one of its ends and by a third conduit D from the opposite end of the box.

In Fig. 21 the box is shown to have at each end provided with means for coupling said ends with four conduits, and in Fig. 22 the box is shown to be provided with means for coupling it to two conduits, which are extended outward horizontally in opposite directions and in alinement with the body of the box.

In the views above described the box A and conduit D are mainly designed for use within buildings, yet they may be applied to structures or devices for use with insulated wires outside of buildings and in open air as box A is applied to and coupled with conduits $C^2$ $C^2$ of a street-lamp. (Shown in Fig. 13.)

The following is my preferred manner of introducing into the chamber B of the box A the wires W W' and arranging them in said chamber for their separation and leading out therefrom: The two wires to be incased in the conduit D and then to be individually branched from the same and away from each other to an exit out from the chamber B are to be introduced into the said conduit after the box A has been coupled together by the means provided. Then the wires W W', passed from the conduit D into the chamber B of the box, are separated, and one of these separated wires is passed through the central opening F' in one of insulators F, and the other wire is passed through the perforation F' in the other insulator F, when the closing-piece $A^2$ will be placed over the open end of chamber B of said box, with the separated wires projected out from said insulators to a distance preferred, when the said closing-piece A' will be secured in place on the open side of body A' of the box, with projections $f^2$ of the insulators in the groove $a^4$ or cavity $a^5$, by the screws $b\ b$, when the conduit D may be placed in position and be secured in place, with the side of the box A having its guard $a^3$ in bearing against the partition, wall, or ceiling of the building to which this box and conduit are to be applied It should be understood that conduit D may be of any suitable length for passage only through timbers or other material or for inclosing the wires in their whole length between ceiling and floor or between partitions or walls, and when so inclosed the wires may be protected from injury and with this improved box prevent accident to each separated wire and prevent the wires having contact with inflammable substances.

Having described my invention, what I claim, and desire to secure by Letters Patent, is—

1. A branch box for wires comprising a hollow body open on one side and provided with an opening for the introduction of a wire, seats formed in the hollow body, a cover adapted to fit over the open face, openings formed in the cover, insulators having stops and fitting in the cover-openings and held located in said openings by the stops, said stops engaging the seats of the hollow body, and means for fastening the cover to the hollow body.

2. A branch box for wires comprising a hollow open body formed with one or more perforations for the passage of wires, a detachable cover formed with openings, detachable insulators in said openings, means carried by the hollow body which coact with the insulators to lock the latter to the box, and means for fastening the cover to the box.

3. A branch box for wires comprising a hollow open body formed with one or more perforations for the passage of wires, a detachable cover formed with openings, the edges of the latter being notched, insulators having lugs, the shape of the insulators and their lugs corresponding to the shape of the openings and notches, means on the box which coact with the lugs to lock the insulators against displacement, and means for fastening the cover to the hollow body.

MORTON HAVENS, Jr.

Witnesses:
 CHARLES SELKIRK,
 A. SELKIRK, Jr.